United States Patent [19]
Osthoff

[11] 4,438,726
[45] Mar. 27, 1984

[54] COVER GRATING FOR MANURE REMOVAL CANALS IN STABLES

[76] Inventor: Herbert Osthoff, Lindenstrasse 9, Mühldorf/Ehring, Fed. Rep. of Germany

[21] Appl. No.: 438,959

[22] Filed: Nov. 3, 1982

[30] Foreign Application Priority Data

Nov. 24, 1981 [DE] Fed. Rep. of Germany ....... 3146564

[51] Int. Cl.³ .............................................. A01K 1/00
[52] U.S. Cl. ........................................ 119/28; 52/669
[58] Field of Search ...................... 119/16, 28; 52/177, 52/180, 664, 667, 668, 669

[56] References Cited

U.S. PATENT DOCUMENTS

| | | | |
|---|---|---|---|
| 3,469,509 | 9/1969 | Hutchinson | 52/180 |
| 3,540,178 | 11/1970 | Altissimo | 52/669 |
| 3,633,548 | 1/1972 | Kepple | 52/669 |
| 3,721,215 | 3/1973 | Vickstrom et al. | 119/28 |
| 3,913,291 | 10/1975 | Dulien et al. | 52/177 |
| 4,077,334 | 3/1978 | Svirklys | 52/669 |
| 4,356,792 | 11/1982 | Leverett | 119/28 |

FOREIGN PATENT DOCUMENTS 2409709 9/1975 Fed. Rep. of Germany ........ 52/669
2939419 9/1979 Fed. Rep. of Germany .

Primary Examiner—Robert Peshock
Assistant Examiner—Kris R. Schulze
Attorney, Agent, or Firm—Toren, McGeady and Stanger

[57] ABSTRACT

A cover grating for manure removal canals in stables is formed of elongated lower supports disposed in lateral spaced relation with elongated upper supports mounted on and extending transversely of the lower supports. The upper supports can be inserted downwardly into the lower supports in a direction extending transversely of the longitudinal directions of the upper and lower supports. Openings are formed in the lower supports extending transversely of their elongated direction. The upper supports have downwardly projecting longitudinally extending flanges supported on the lower supports. Further, downwardly extending pawl strips in the upper supports extend through the openings in the lower support and are lockably engaged with walls within the lower support. The walls within the lower support divide it into individual box-like chambers. As an alternative, in place of the pawl strips, the flanges inserted into the box-like chambers can be provided with holes through which a locking rod can be inserted in the long direction of the lower support for lockably engaging the upper supports to the lower supports.

4 Claims, 5 Drawing Figures

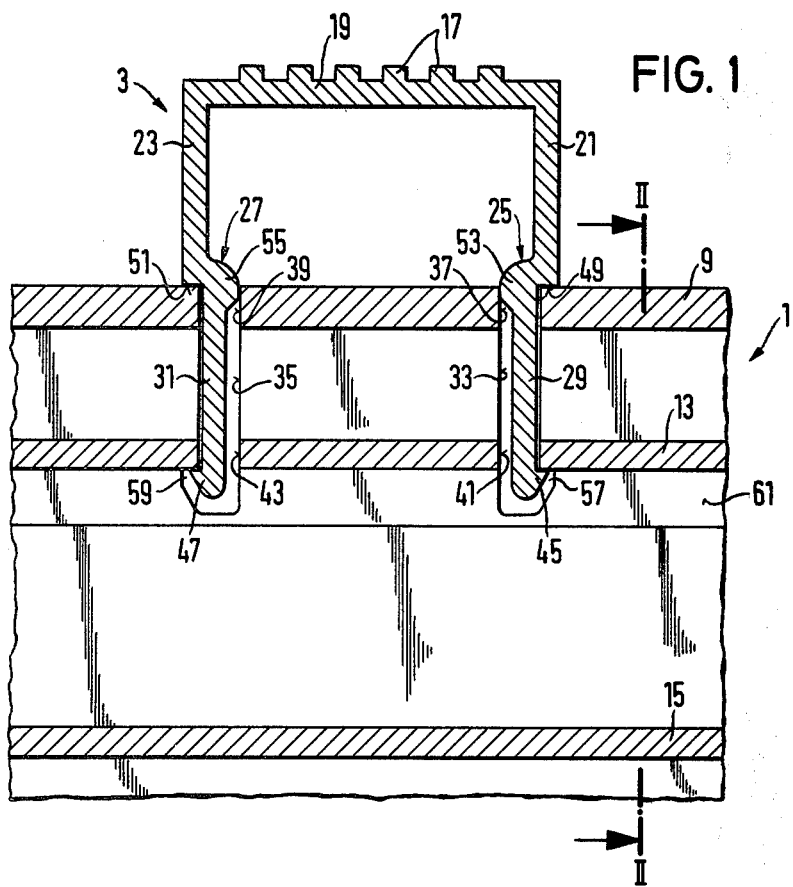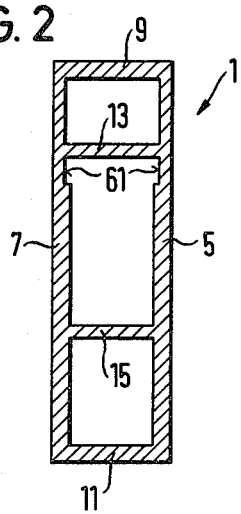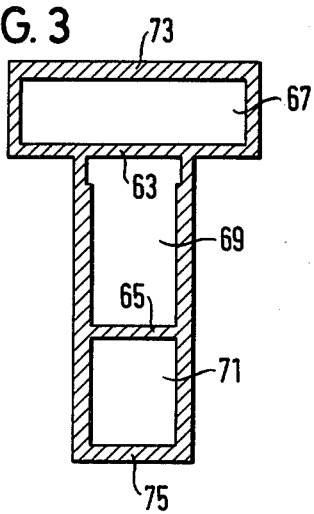

COVER GRATING FOR MANURE REMOVAL CANALS IN STABLES

SUMMARY OF THE INVENTION

The present invention is directed to a cover grating for manure removal canals in stables and is formed of laterally spaced lower supports and upper supports disposed in laterally spaced relation and extending transversely of the lower supports. The upper supports are detachably engageable with the lower supports and have downwardly projecting longitudinally extending flanges which engage into transversely extending openings in the lower supports and secure the upper supports against movement at least in the longitudinal direction of the lower supports.

Such cover gratings, particularly for manure removal canals in cow sheds, are disclosed in German Offenlegungsschrift 29 39 419. The longitudinal flanges of the upper supports have a downwardly expanding cross-sectional shape located in form-locking engagement in correspondingly shaped transverse openings in the lower support. During assembly of the cover grating, the upper supports are inserted in their longitudinal direction into the transverse openings of the lower supports. Since the upper supports extend in the long direction of the manure removal canal, they are of a considerable length and make assembly of the cover grating difficult. Furthermore, the exchange of worn, particularly bent, upper supports is difficult, especially when the longitudinal flanges are jammed in the openings.

Therefore, it is the primary object of the present invention to provide a cover grating for manure removal canals in stables in which the above disadvantages are avoided and, in particular, installation and removal of the upper supports can be effected in a direction extending transversely of the plane of the cover grating.

In accordance with the present invention, the longitudinal flanges formed on the upper supports can be inserted transversely to the longitudinal direction of the upper supports into the transverse openings in the lower supports. Further, at least one of the longitudinal flanges on each upper support can be secured or locked into the lower support so that it cannot be pulled out opposite to the insertion direction.

In the cover grating according to the present invention, the upper supports are pressed downwardly into the transverse openings of the lower supports and lock automatically into the lower supports or means are provided to lock them in place. After the release of the locking engagement of the supports, the upper support can be lifted and replaced and, if necessary, the upper supports can also be detachably secured by screws.

In a preferred embodiment, the lower supports have a box-like shape. The upper supports are basically U-shaped and can be inserted into the lower support when the U-shaped upper supports are inverted. The legs of the U-shaped upper support form flanges at least one of which can be inserted into the lower support. Depending on the embodiment, the legs or flanges can be supported at the uppermost, generally horizontally extending wall of the box-like section of the lower support or at a lower interior wall within the lower support. For improved guidance, preferably both of the legs or flanges of the U-shaped section extend downwardly through transverse slots into the box-like lower section. In this embodiment, U-shaped sections with adequately long legs or flanges are capable of supporting a load without considerably enlarging the vertical height of the cover grating. The upper surface of the base or bight portion of the U-shaped upper support is provided with antiskid ribs, if necessary, for forming the wearing surface of the upper support. In one preferred embodiment, at least one of the elongated flanges of each upper support includes a pawl strip which can be engaged within the lower support so that it cannot be pulled out opposite the insertion direction, Further, the pawl strip is elastically displaceable in the long direction of the lower supports. Such pawl strips are secured automatically during the insertion of the upper support downwardly through the transverse openings in the lower supports. To replace an upper support, the pawl strips are accessible from the sides of the lower supports and can be released.

Advantageously, the pawl strips penetrate through slots in the walls of the box-like lower support which walls extend parallel to the plane of the upper surface of the upper supports and lockably engage below these walls. Lower supports of this construction can be more economically produced than the form-locking openings in the lower supports of the known cover grating discussed above.

In one embodiment, the pawl strips may be positioned in a protected manner between the legs or flanges of the U-shaped upper support. In such an arrangement, both the flanges and the pawl strips penetrate the upper wall of the lower support. The pawl strips engage the underside of the upper wall, while the outwardly disposed flanges are supported on another horizontal wall within the box-like lower support which is spaced downwardly from the upper wall.

In another preferred embodiment, both of the legs or flanges of the U-shaped upper support have a stop surface forming a shoulder supported on the upper surface of the lower support. Further, these flanges are secured within transverse slots in the upper wall of the lower support preventing displacement in the longitudinal direction of the lower support. Within the box-like lower support, these flanges are formed as pawl strips which engage below another wall of the box-like lower support, which wall extends parallel to but is spaced below the wall on which the stop surfaces rest. In this embodiment, the upper supports have a particularly simple profile. It is also advantageous that the upper supports can be supported on the relatively thick upper walls of the box-like lower supports, while the lower inner walls of the box-like section are basically used only for locking engagement with the pawl strips.

In still another preferred embodiment, the lower supports have a box-like shape. The legs or flanges of the U-shaped upper support extend downwardly into the interior of the box-like lower support, at least into the upper portion of the lower support. The portions of the flanges extending into the lower supports are provided with openings aligned in the longitudinal direction of the lower supports. A locking rod can be inserted in the long direction of the lower supports through the openings for locking the upper supports in place. In such an arrangement, the box-like lower support is divided into a number of chambers one located below the other. Preferably, the uppermost chamber receives the flanges and the locking rod is inserted into this chamber in the long direction. It has proven to be adequate if the upper supports are locked only at each of the fourth or fifth lower supports. To facilitate installation, the openings in the flanges of the upper supports are formed as oblong holes with the major direction of such holes extending in the long direction of the upper supports. It would be possible to provide two locking rods for each lower support with each rod being inserted from an opposite end. For the sake of simplicity, however, the locking rods extend through all of the upper supports which rest on the individual lower supports.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a sectional view through the intersection of a lower and an upper support of a cover grating embodying the present invention;

FIG. 2 is a transverse cross-sectional view through the lower support taken along the line II—II in FIG. 1;

FIG. 3 is a transverse cross-sectional view through another embodiment of the lower support capable of being used for the cover grating according to FIG. 1;

DETAIL DESCRIPTION OF THE INVENTION

Figure 4:
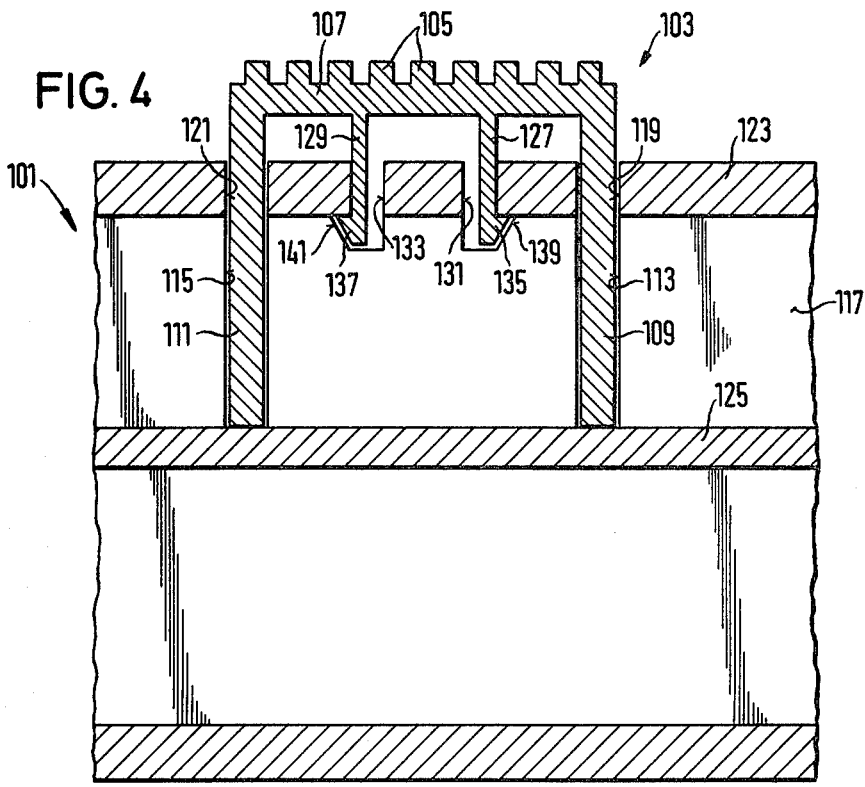
FIGS. 4 and 5 are sectional views, similar to FIG. 1, through the intersection of lower and upper supports of two additional embodiments of the cover grating of the present invention.

In FIG. 1 a portion of a cover grating for elongated manure removal canals in stables, particularly in stables for dairy cattle, is illustrated and the grating is made up of a plurality of elongated lower supports 1 which are disposed in parallel spaced apart relation, and a plurality of elongated upper supports 3 extending preferably at right angles to the lower supports with the upper supports also disposed in parallel spaced apart relation. As can be seen in FIG. 2, the lower supports 1 have a rectangular box-like shape with the longer sides 5, 7 extending vertically while the shorter sides 9, 11 extend horizontally with side 9 forming the upper side or wall of the lower support. Within the lower support 1, a pair of vertically spaced dividing walls 13, 15 are located and these walls are disposed generally parallel to the upper and lower sides or walls 9, 11. Dividing walls 13, 15 are thinner than the other walls forming the box-like section and divide the interior of the lower support into a number of elongated horizontal chambers located one above the other.

The upper supports 3 are elongated and basically U-shaped, however, in the inserted position the U-shaped members are inverted. Accordingly, the bight section or base wall 19 of the upper support forms its upper surface and the upper surface is provided with longitudinally extending antiskid ribs 17. An elongated leg or flange 21, 23 extends downwardly at right angles from each of the opposite edges of the base wall 19. At a distance spaced downwardly from the base wall 19, each flange 21, 23 has an offset part or bend 25, 27. Below the bends 25, 27 the flanges extend downwardly in the form of pawl strips 29, 31 to the lower free longitudinal edges of the flanges 21, 23. In the assembled position shown in FIG. 1, pawl strips 29, 31 extend downwardly through openings 33, 35 in the lower supports. The openings extend transversely of the elongated direction of the lower supports. As a result, the pawl strips 29, 31 pass downwardly through the upper wall 9 provided with the slots 37, 39 and also through the lower dividing wall 13 provided with slots 41, 43. The lower or free end of each of the pawl strips 29, 31 has a laterally outwardly projecting locking rib 45, 47 which faces outwardly away from the other rib and engages the other side of the dividing wall 13. These locking ribs 45, 47 pass through the slots 41, 43. The offsets or bends 25, 27 form support shoulders 49, 51 which face downwardly toward the upper surface of the lower support and bear against the upper surface formed by the upper wall 9. These shoulders 49, 51 bear against the upper wall 9 along the edges of the slots 37, 39. Therefore, pawl strips 29, 31 on the upper support 3 are inserted downwardly through the top of the lower support 1 through the slots 37, 39 and the opening 33, 35 and automatically lockably engage the lower supports due to the elastic characteristics of the upper supports. The upper supports 3 are inserted downwardly into the lower supports 1 in the direction extending transversely of the elongated directions of the upper and lower supports and transversely of the plane of the upper surface of the cover grating defined by the base wall 19 of the upper support. The slots 37, 39, 41, and 43 and the openings 33, 35 are wider in the elongated direction of the lower supports than the thickness of the pawl strips 29, 31 so that the locking ribs 45, 47 can pass downwardly into locking engagement with the lower support. Moreover, to secure the upper supports in the elongated direction of the lower supports, the offsets or bends 25, 27 each form an inwardly directed rib 53, 55 which fits closely within the slots 37, 39 in the upper wall 9 of the lower support.

The openings 33, 35 in the side walls 5, 7 and in the upper wall 9, as well as in the dividing wall 13, are formed by conventional methods, such as by milling. It would also be possible to mill the recessed opening 57, 59 into which the locking ribs 45, 47 engage, however, such a milling operation would require complicated tools. It is preferable to punch out these recessed openings following the milling operation. To facilitate the punching operation, the vertically extending side walls 5, 7 of the lower supports 1 in the region below the dividing wall 13 are provided with interior elongated grooves 61 which reduce the wall thickness so that the recesses can be easily punched out.

In FIG. 3 a cross-section of another embodiment of the lower support is illustrated and the only difference from the lower support shown in FIG. 2 is the T-shaped cross-section. This lower support is divided into three interior chambers 67, 69 and 71 separated by the horizontal dividing walls 63, 65. Dividing walls 63, 65 extend parallel to the upper wall 73 and the lower wall 75. Upper wall 73 is considerably wider than the lower wall 75 to increase the contact surface with the upper supports.

Another embodiment of the cover grating is displayed in FIG. 4 made up of lower supports 101 and upper supports 103. The lower supports 101 have a box-like shape, similar to that illustrated in FIGS. 2 and 3. Further, upper supports 103 have a U-shaped configuration with the bight section or base wall 107 provided with longitudinally extending antiskid ribs 105 and downwardly extending legs or flanges 109, 111 extending normally of the upper base wall 107. In the assembled arrangement, flanges 109, 111 are located within openings 113, 115 in the vertically extending side walls 117 of the lower support. When the legs or flanges 109, 111 are inserted into the lower support they pass through transverse slots 119, 121 in the upper horizontal wall 123 of the lower support. In the inserted position, the lower ends of the flanges 109, 111 bear against the upper surface of the dividing wall 125 within the lower support 101. The width of the slots 119, 121 is adapted to the thickness of the flanges 109, 111 so that the upper supports are secured against displacement in the longitudinal direction of the lower supports 101.

Spaced inwardly from the legs or flanges 109, 111, a pair of elongated, spaced, parallel pawl strips 127, 129 project downwardly from the lower side of the upper base wall 107 and extend through slots 131, 133 formed in the upper horizontally extending wall 123 of the lower support 101. These pawl strips 127, 129 are spaced laterally apart from one another and also from the flanges 109, 111. At their lower free ends, the pawl strips have locking ribs 135, 137 projecting laterally outwardly and in the opposite directions to one another so that the ribs engage below the lower surface of the top wall 123 along the edges of the slots 131, 133. In the locked state, the locking ribs 135, 137 extend into release recesses 139, 141 in the vertical side walls 117 of the lower support 101. Further, in this embodiment, the upper supports are inserted from the top downwardly into the lower supports, that is, the upper supports are inserted transversely of the elongated directions of the upper and lower supports and also transversely of the plane of the upper surface of the cover grating defined by the upper surface of the base wall 107 of the upper support 103. The pawl strips 127, 129 have an elastic characteristic so that their locking ribs 135, 137 deflect laterally as the upper support is inserted into the lower support and then lock automatically with the underside of the top wall 23 when the insertion operation is completed.

Figure 5:
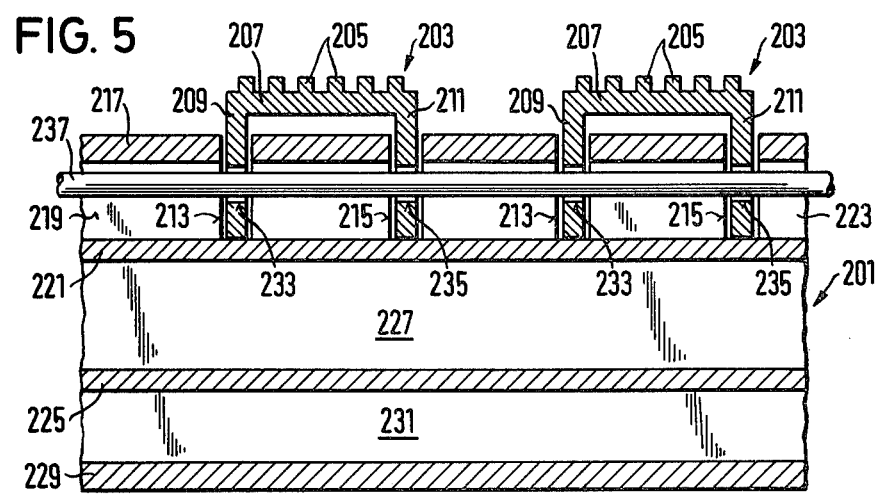

In FIG. 5 another embodiment of the present invention is shown and the cover grating includes elongated lower supports 201 extending in the horizontal direction and disposed parallel to one another. Further, upper supports 203 are also elongated and extend horizontally and are disposed at right angles to the elongated direction of the lower supports 201. Lower supports 201 have a box-like configuration similar to the supports displayed in FIGS. 2 and 3. Upper supports 203 are U-shaped, however, as in the other embodiments of the U-shaped supports are inverted so that the legs or flanges 209, 211 extend downwardly from the bight section or base wall 207. The upper surface of the base wall 207 is provided with longitudinally extending antiskid ribs 205. The flanges 209, 211 have inside and outside flat planar surfaces extending downwardly at right angles to the base wall 207. Flanges 209, 211 pass through slot-like openings 213, 215 in the lower supports 201. The openings 213, 215 extend through the upper horizontally extending wall 217 of the box-like lower support 201 and through the vertical side walls 219 extending downwardly from the upper wall 217. The openings 213, 215 terminate at the horizontally extending upper dividing wall 221 spaced downwardly from the top wall 217. Side walls 219 in combination with the horizontal walls 217, 221 form an upper chamber 223 extending in the long direction of the lower support 201.

Another horizontal dividing wall 225 is spaced downwardly from the dividing wall 221 and forms in combination with the side walls 219 and the horizontal bottom wall of the lower support an intermediate chamber 227 and a lower chamber 231 both of which extend in the elongated direction of the lower support. The flanges 209, 211 of the upper support 203 disposed in spaced side-by-side relation in the long direction of the lower support 201 are provided inside the upper chamber 223 with oblong holes 233, 235 aligned in the long direction of the lower support 201. A locking rod 239 is inserted through the oblong holes in the long direction of the lower support. Basically, the locking rod 237 extends over the full length of the lower support or, if necessary, it may be divided in the center. As viewed in its long direction the upper support 203, may be locked by the locking rod 237 to each fourth or fifth lower support 201. During assembly, the upper supports 203 are inserted downwardly into the transverse openings 213, 215 formed in the lower supports and then are locked by inserting the locking rod 239 through the aligned oblong holes 233, 235.

While specific embodiments of the invention have been shown and described in detail to illustrate the application of the inventive principles, it will be understood that the invention may be embodied otherwise without departing from such principles.

I claim:

1. A cover grating for manure removal canals in stables comprising elongated lower supports disposed in spaced apart relation, elongated upper supports disposed in spaced apart relation and extending transversely of the elongated direction of said lower supports, said upper supports supported on and detachably engaged to said lower supports, said lower supports having openings therein extending transversely of the elongated direction thereof, said upper supports having downwardly extending flanges extending in the elongated direction of said upper supports and engageable within the transverse openings in said lower supports for securing said upper supports against displacement in the elongated direction of said lower supports, wherein the improvement comprises that said flanges are inserted transversely of their elongated direction into said openings in said lower supports and at least one of said flanges on each of said upper supports can be lockably engaged in said lower support against removal opposite to the insertion direction, said lower supports have a box-like shape in transverse section comprising a number of walls and said upper supports have a U-shape transverse section with the U-shaped section inverted relative to said lower supports when said upper supports are inserted into said lower supports, and at least one of said flanges on each of said upper support being inserted downwardly into said transverse openings in said lower supports, said elongated flanges of said upper supports form the legs of the U-shaped transverse section and are supported on a wall surface of said lower support, and said upper supports each having an upwardly facing substantially horizontal surface forming the plane of said upper supports and said wall surfaces of said lower supports supporting said flanges are disposed in parallel relation to the plane of said upper supports, said wall surfaces of said lower supports supporting said flanges of said upper supports form the upper horizontal wall of said box-shaped section of said lower support, at least one of said elongated flanges on each of said upper supports includes a vertically extending pawl strip forming the lower end of said flange and depending downwardly from the location where said flange is supported on the wall surface of said lower support, said pawl strip is securable in detachable locking engagement with said lower supports against being removed from said lower support in the direction opposite to the insertion direction of said upper supports, and said pawl strip is elastically deflectable in the elongated direction of said lower supports when said upper support is inserted into said lower supports and for removing said upper supports from said lower supports.

2. A cover grating, as set forth in claim 1, wherein said lower supports include at least one horizontally extending dividing wall located within said box-like section and spaced below the upper horizontal wall of said box-like section, said at least one pawl strip extends downwardly through said transverse openings in the wall surfaces of said box-like section lower supports and said pawl strips lockably engage behind the lower surfaces of said dividing wall of said lower supports.

3. A cover grating, as set forth in claim 1, wherein each of said flanges forming one of the downwardly extending legs of each said U-shaped upper support has a horizontally arranged supporting shoulder thereon located on the outside surface of said flange and shoulder is supported on the upper horizontal wall of said box-like section of said lower supports, below said shoulders said flanges are secured in transverse openings in the upper horizontal wall of said lower supports, and the free ends of said flanges located downwardly within said lower supports from the upper horizontal wall thereof form said pawl strips, said lower supports each having an interior dividing wall spaced downwardly below and in generally parallel relation with the upper horizontal wall thereof, and the lower ends of said pawl strips lockingly engage with the underside of said dividing wall.

4. A cover grating, as set forth in claim 1, wherein each said flange has an offset directed toward the interior of said upper support, said offset is located at the upper end of said pawl strip, and in the assembled position of said upper support in said lower support said offset and the opposite surface of said flange at said offset are in contact with the opening in said lower support so that lateral play of said flange in the opening is prevented.

* * * * *